United States Patent
Tanaka et al.

[19]

[11] Patent Number: 5,926,307
[45] Date of Patent: Jul. 20, 1999

[54] OPTICAL DEFLECTION DEVICE

[75] Inventors: Akihiro Tanaka, Chiba; Hiroshi Kanazawa, Tokyo, both of Japan

[73] Assignee: Asahi Kogaku Kogyo Kabushiki Kaisha, Tokyo, Japan

[21] Appl. No.: 08/992,809

[22] Filed: Dec. 18, 1997

[30] Foreign Application Priority Data

Dec. 19, 1996 [JP] Japan .................................. 8-354325
Dec. 19, 1996 [JP] Japan .................................. 8-354326

[51] Int. Cl.$^6$ .................................................. G02B 26/08
[52] U.S. Cl. .......................... 359/224; 359/198; 359/211
[58] Field of Search ..................................... 359/223, 224, 359/209, 211, 196–199; 185/37, 45; 369/44.15, 44.16

[56] References Cited

U.S. PATENT DOCUMENTS 5,249,173  9/1993  Tanaka .
5,280,377  1/1994  Chandler et al. ....................... 359/224

FOREIGN PATENT DOCUMENTS 58-37619  8/1983  Japan .
3-49409   7/1991  Japan .
7-28585   8/1992  Japan .

*Primary Examiner*—James Phan
*Attorney, Agent, or Firm*—Greenblum & Bernstein, P.L.C.

[57] ABSTRACT

An optical deflection device is used to deflect a light beam, such as a laser beam, and comprises a base member, a movable member having an optical deflection element, and a set of leaf-spring assemblies provided at respective sides of the movable member. Each of the leaf-spring assemblies is interposed between the base member and a corresponding side of the movable member such that the movable member is resiliently and movably supported by the leaf-spring assemblies with respect to the base member. Each of the leaf-spring assemblies is formed from at least three leaf-spring elements arranged at uniformly angular intervals around an elastic-main-axis of the movable member.

20 Claims, 10 Drawing Sheets

OPTICAL DEFLECTION DEVICE

BACKGROUND OF THE INVENTION

1. Field of the Invention

The present invention relates to an optical deflection device for deflecting a light beam, such as a laser beam, which is used as an element of an optical system for recording digital data on and reading the recorded digital data out of an optical disk or optical-magnetic disk.

2. Description of the Related Art

As a representative optical deflection device, a galvanomirror device is well known, as disclosed in, for example, Examined Japanese Utility Model Publication No. 7-28585 corresponding to U.S. Pat. No 5,249,173. This galvanomirror device or optical deflection device comprises a yoke member having two opposed projections protruding from the ends thereof, and a movable member supported by a pair of leaf springs securely attached to the opposed projections of the yoke member. The movable member includes an electromagnetic coil, which operates in conjunction with permanent magnets, supported by the yoke member, such that the electromagnetic coil is interposed between the permanent magnets. The movable member further includes a mirror element securely attached thereto. The pair of leaf springs is arranged so as to define a rotational axis passing through the center of gravity of the movable member.

When an electrical current flows in the electromagnetic coil, the electromagnetic coil, and therefore the movable member, is subjected to a rotational force in accordance with Fleming's Rule. The movable member is rotated around the rotational axis in a rotational direction defined by a direction of flow of the electrical current. A degree of the rotation of the movable member depends upon an amount of electrical current flowing through the electromagnetic coil. Thus, it is possible to deflect a light beam, made incident on the mirror of the movable member, in a desired direction by controlling the amount of electrical current flowing through the electromagnetic coil.

Nevertheless, in the optical deflection device, as disclosed in U.S. Pat. No. 5,249,173, the leaf springs are susceptible to structure-coupled-oscillations and thrust-coupled-oscillations, resulting in the optical deflection device being subjected to harmful influences, such as dynamic crosstalk. The induced oscillations occur due to the high compliance exhibited by each of the leaf springs in the direction perpendicular to the main surface of the leaf spring.

Note, the structure-coupled-oscillations are defined as coupled-oscillations produced in the leaf springs due to outside forces exerted upon the optical deflection device, and the thrust-coupled-oscillations are defined as coupled-oscillations produced in the leaf springs due to rotational forces of the movable member.

Examined Japanese Patent Publication No. 3-49409 discloses another type of optical deflection device which comprises a base member, and a movable member supported, at opposed sides thereof, by two sets of crosswise leaf springs securely attached to the base member. The movable member includes two electromagnetic coils provided at the other opposed sides thereof, respectively, and the electromagnetic coil operates in conjunction with permanent magnets provided beside the other opposed sides of the movable member. The movable member further includes a mirror element securely attached to the movable member. In this optical deflection device, the movable member is also rotated in accordance with Fleming's Rule around a rotational axis defined by the two sets of crosswise leaf springs.

Although the two sets of crosswise leaf springs are less susceptible to the structure-coupled-oscillations and the thrust-coupled-oscillations than the leaf springs disclosed in U.S. Pat. No. 5,249,173, due to the crosswise arrangement of the leaf springs, the crosswise leaf springs are still prone to the structure-coupled-oscillations and the thrust-coupled-oscillations. In particular, the crosswise leaf springs are securely attached to the base member and the movable member, and, due to these locations of attachment being spaced radially away from the rotational axis of the movable member, the oscillations occur.

Also, in assembling the optical deflection device, it is difficult to precisely align the intersection point of the crosswise leaf springs with the rotational axis of the movable member, because of the inherent constructional arrangement of the optical deflection device. Further, the movable member must have two respective sets of block elements, to which the two sets of crosswise leaf springs are securely attached. Of course, the moment of inertia of the movable member is increased due to the addition of the block elements thereto, resulting in a deterioration in the responsiveness of the rotational movement of the movable member, and therefore the mirror.

SUMMARY OF THE INVENTION

Therefore, an object of the present invention is to provide an optical deflection device comprising a base member, a movable member having an optical deflection element, and a set of leaf-spring assemblies provided at sides of the movable member and interposed between the base member and the movable member such that the movable member is resiliently and movably supported by the leaf-spring assemblies with respect to the base member, wherein the leaf-spring assemblies are less susceptible to both structure-coupled-oscillations and thrust-coupled-oscillations.

Another object of the present invention is to provide an optical deflection device as mentioned above, further comprising a set of releasable couplings which are arranged such that the leaf-spring assemblies can be easily incorporated between the base member and the movable member.

In accordance with a first aspect of the present invention, there is provided an optical deflection device comprising: a base member; a movable member having an optical deflection element; and a set of leaf-spring assemblies provided at sides of the movable member and interposed between the base member and the movable member such that the movable member is resiliently and movably supported by the leaf-spring assemblies with respect to the base member, wherein each of the leaf-spring assemblies is formed from at least three leaf-spring elements arranged at uniformly angular intervals around an elastic-main-axis of the movable member.

In accordance with a second aspect of the present invention, there is provided an optical deflection device comprising: a base member; a movable member having an optical deflection element; a set of leaf-spring assemblies provided at sides of the movable member and interposed between the base member and the movable member such that the movable member is resiliently and movably supported by the leaf-spring assemblies with respect to the base member, each of the leaf-spring assemblies being formed from at least three leaf-spring elements arranged at uniformly angular intervals around an elastic-main-axis of the movable member; and a set of releasable couplings provided at the sides of the movable member, each of the releasable coupling releasably connecting an end of the corresponding leaf-spring assembly to either the movable member or the base member.

In accordance with a third aspect of the present invention, there is provided an optical deflection device comprising: a base member; a movable member having an optical deflection element; a set of leaf-spring assemblies provided at sides of the movable member and interposed between the base member and the movable member such that the movable member is resiliently and movably supported by the leaf-spring assemblies with respect to the base member, each of the leaf-spring assemblies being formed from at least three leaf-spring elements arranged at uniformly angular intervals around an elastic-main-axis of the movable member; a first set of releasable couplings provided at the sides of the movable member, each of the releasable couplings in the first set releasably connecting an end of the corresponding leaf-spring assembly to the movable member; and a second set of releasable couplings provided at the sides of the movable member, each of the releasable couplings in the second set releasably connecting an end of the corresponding leaf-spring assembly to the base member.

Preferably, the elastic-main-axis of the movable member coincides with either an inertial-main-axis or a thrust-main-axis of the movable member. More preferably, the elastic-main-axis of the movable member coincides with both the inertial-main-axis and the thrust-main-axis of the movable member. Also, it is preferable that all of the leaf-spring elements are identical to each other.

BRIEF DESCRIPTION OF THE DRAWINGS

The objects and other objects of the present invention will be better understood from the following description, with reference to the accompanying drawings in which.

DESCRIPTION OF THE PREFERRED EMBODIMENTS

Figure 1:
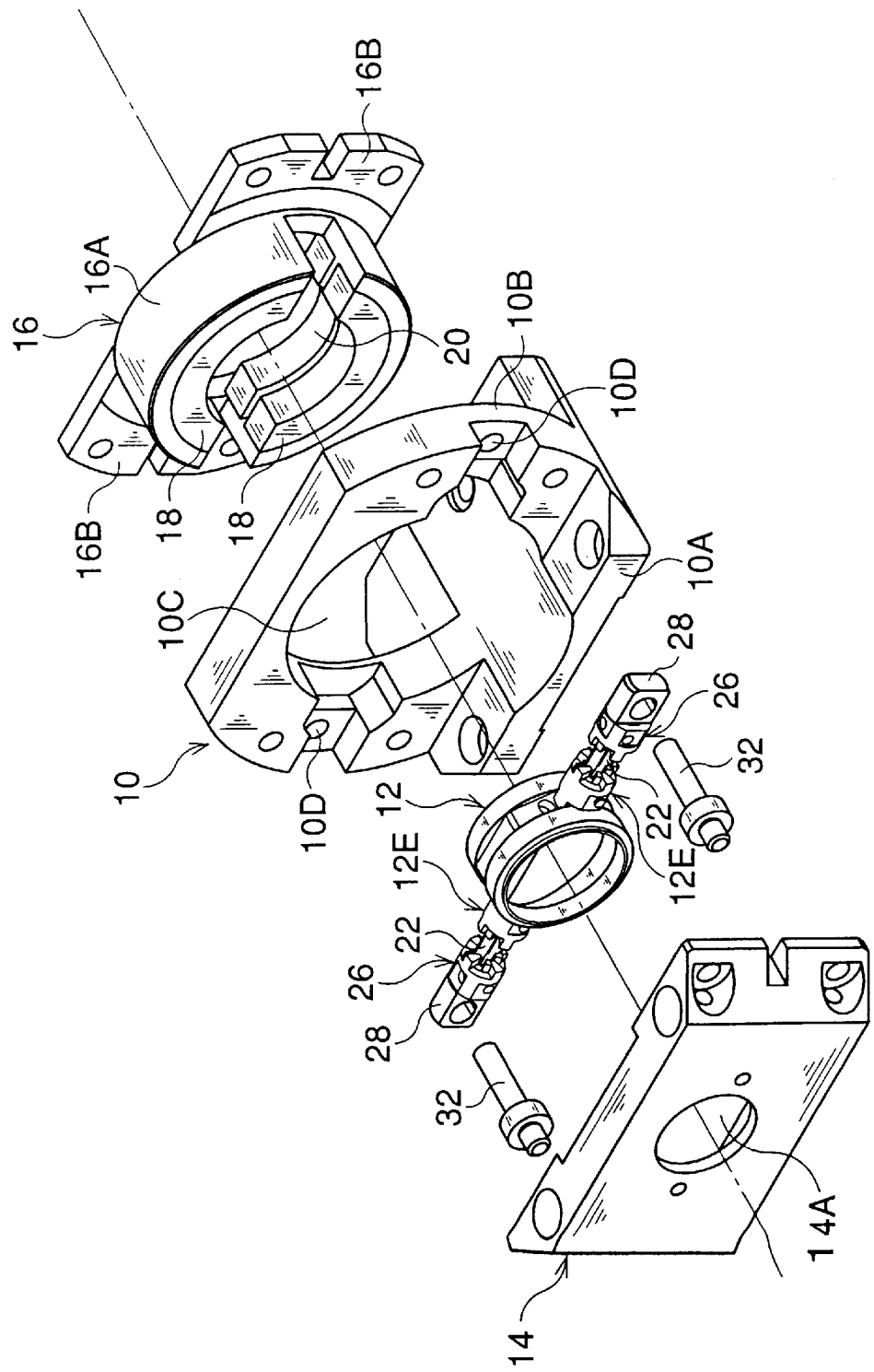
FIG. 1 is an exploded perspective view of an optical deflection device according to the present invention.

FIG. 1 shows an optical deflection device according to the present invention, which comprises a base member 10 made of a suitable metal material such as aluminum, aluminum alloy or the like. The base member 10 includes a root portion 10A, and a frame portion 10B unitarily extended vertically from the root portion 10A. During assembly, the root portion 10A is used for attaching the optical deflection device to an optical system which records digital data on and reads the recorded digital data out of an optical disk or optical-magnetic disk. The frame portion 10B is formed with a circular opening 10C. A movable member 12 having a cylindrical shape, also constituted as part of the optical deflection device, is received in the circular opening 10C of the base member 10 in a manner stated in detail hereinafter.

A generally-rectangular cover member 14 is attached to a front side of the base member 10, and has a circular opening 14A formed therein. A magnet holder member 16 is attached to a rear side of the base member 10, and includes a collar-shaped holder portion 16A, and two ear portions 16B unitarily extending diametrically from sides of the holder portion 16A. Preferably, the cover member 14 and the magnet holder member 16 may be made of the same metal as that of the base member 10.

Two sets of sector-shaped permanent magnets 18 and 20 are located in the holder portion 16A, and the permanent magnets 18 and 20 in each set are arranged such that opposite magnetic poles are opposing each other. Note, in FIG. 1, one of the permanent magnets 20 is not visible. The ear portions 16B are used for attaching the magnet holder member 16 to the base member 10. The attachment is performed such that the holder portion 16A is accommodated in the circular opening 10C of the frame portion 10B.

Figure 2:
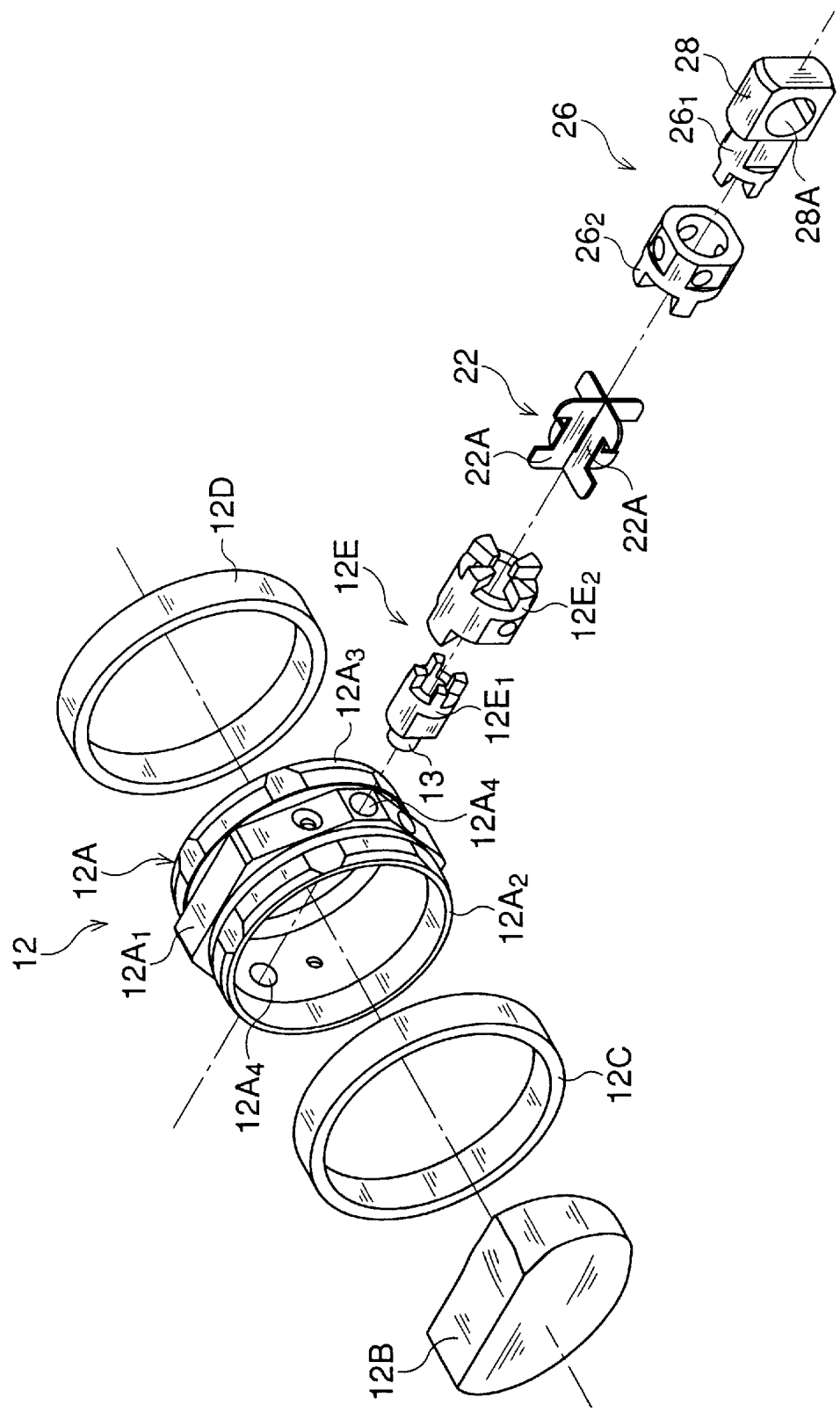
FIG. 2 is an exploded perspective view of a movable member of the optical deflection device shown in FIG. 1.

As best shown in FIG. 2, the movable member 12 comprises a cylindrical holder portion 12A for receiving a prism element 12B, which serves as an optical deflection element. In this embodiment, another type of optical deflection element, such as a reflective mirror element, a light-beam-deflecting hologram element or the like, may be substituted for the prism element 12B.

The cylindrical holder portion 12A includes a central flange $12A_1$ having a polygonal shape, two collar elements $12A_2$ and $12A_3$ protruding from respective sides of the central flange $12A_1$, and two electromagnetic coils 12C and 12D mounted on the collar elements $12A_2$ and $12A_3$, respectively. The electromagnetic coils 12C and 12D operates in conjunction with the two sets of sector-shaped permanent magnets 18 and 20, thereby driving the movable member 12. Note, in FIG. 2, although each of the electromagnetic coils 12C and 12D is illustrated as a solid ring, the coils 12C and 12D are actually formed by turning a wire into a ring-like shape.

The movable member 12 is further provided with two couplings 12E diametrically fixed to the central flange $12A_1$. Each of the couplings 12E includes an immovable coupling part $12E_1$, and a movable coupling part $12E_2$ detachably associated therewith. In particular, the central flange $12A_1$ has two narrow diametrically-opposed side faces, in each of which a threaded hole $12A_4$ is formed. Each immovable coupling part $12E_1$ has an integrally-formed screw 13 protruding therefrom, and the screw 13 of the immovable coupling part $12E_1$ is fixedly threaded in the hole $12A_4$. Note, in FIG. 2, only one of the couplings 12E is illustrated.

Figure 3:
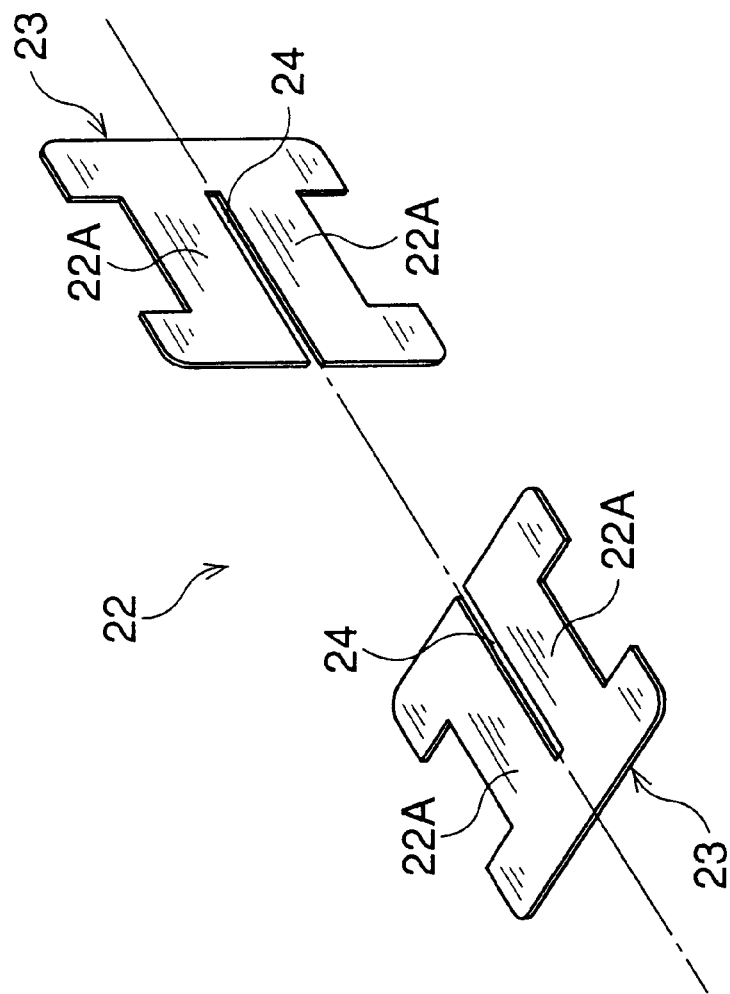
FIG. 3 is an exploded perspective view of a leaf-spring assembly of the optical deflection device shown in FIG. 1.

A leaf-spring assembly 22 is connected at its one end to a coupling 12E, and is composed of two H-shaped spring plates 23, as shown in FIG. 3. The H-shaped spring plates 23 are identical to each other, and a central slit 24 is longitudinally formed in each spring plate 23 such that two leaf spring elements 22A are defined therein. The leaf-spring assembly 22 is obtained from the two H-shaped spring plates 23 by crosswisely interlinking them via the central slits 24 thereof. Thus, in this embodiment, a leaf-spring assembly 22 is formed from the four leaf spring elements 22A spaced apart from each other at uniformly angular intervals around a central longitudinal axis of the leaf-spring assembly 22, so as to define an angle of 90 degrees between two contiguous leaf spring elements 22A.

As is apparent from FIG. 2, the other end of the leaf-spring assembly 22 is connected to another coupling 26, which includes an immovable coupling part $26_1$, and a movable coupling part $26_2$ detachably associated therewith. The coupling 26 is substantially identical to the coupling 12E, except that the immovable coupling part $26_1$ is provided with an integrally-formed block element 28 in place of the screw 13 of the immovable coupling part $12E_1$. The block element 28 has a through hole 28A formed therein, and is used for securely attaching the immovable coupling part $26_1$ to the base member 10.

Figure 4:
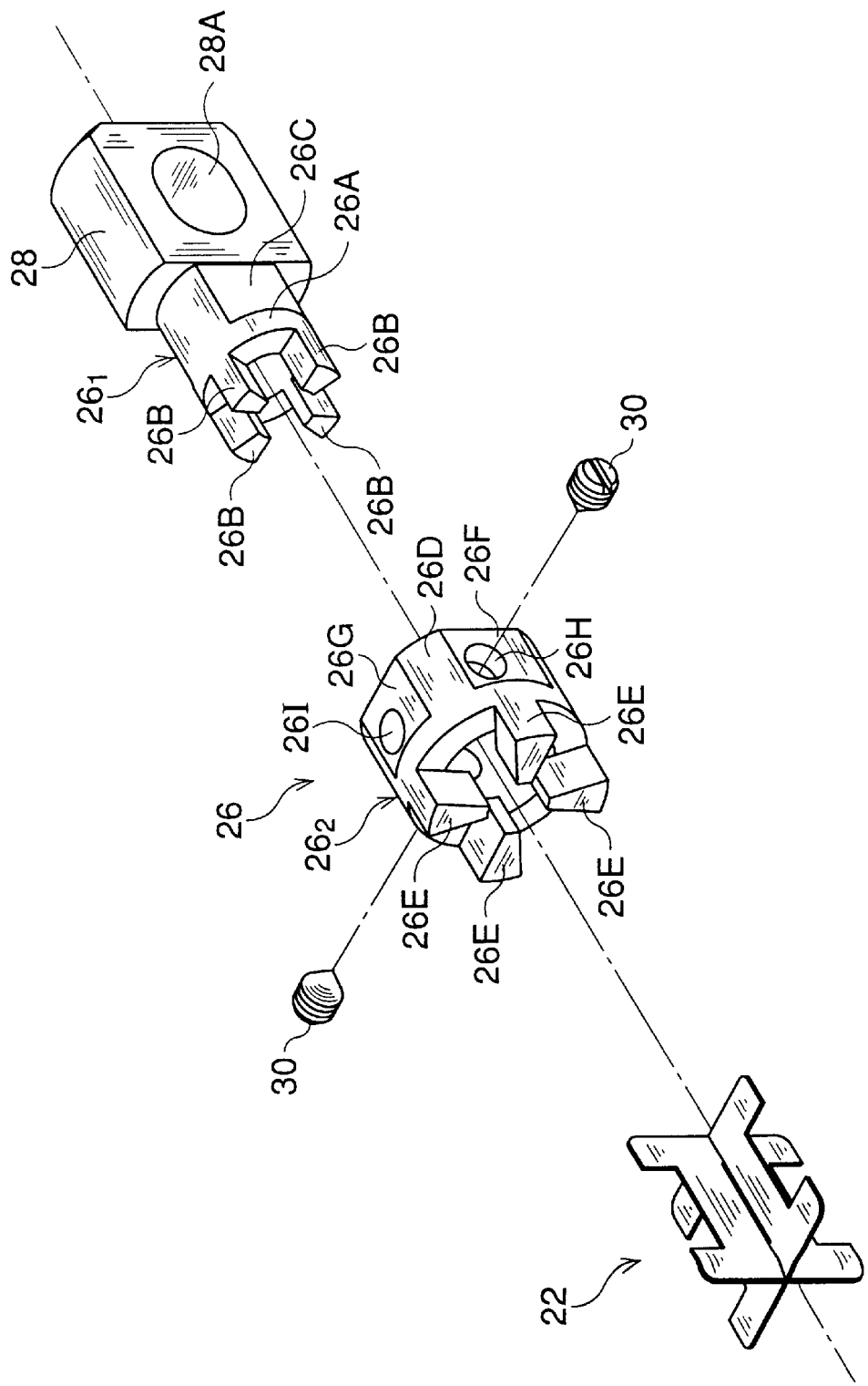
FIG. 4 is an exploded perspective view of a coupling for the leaf-spring assembly.

As best shown in FIG. 4, the immovable coupling part $26_1$ has a castellated element 26A unitarily extending from the block element 28. Four prong elements 26B protrude from the free end face of the castellated element 26A. The four prong elements 26B are spaced apart from each other at uniformly angular intervals around a central longitudinal axis of the castellated element 26A, so as to define an angle of 90 degrees between the neutral planes of the two contiguous prong elements 26B. Also, the four prong elements 26B are identical to each other, each of the prong elements 26B having a sector-shaped cross-section. The castellated element 26A has a set of flat faces 26C formed thereon, the flat faces 26C being diametrically opposed to each other. Note, in FIG. 4, only one of the flat faces 26C is visible.

The movable coupling part $26_2$ of the coupling 26 comprises a tubular castellated element 26D, a diameter of which is larger than that of the castellated element 26A, enabling the castellated element 26A of the immovable coupling part $26_1$ to be slidably and rotatably received in the tubular castellated element 26D of the movable coupling part $26_2$. The castellated element 26D has four prong elements 26E, the four prong elements 26E being spaced apart from each other at uniformly angular intervals around a central longitudinal axis of the castellated element 26D, so as to define an angle of 90 degrees between the neutral planes of two contiguous prong elements 26E.

Similar to the prong elements 26B of the immovable coupling part $26_1$, the four prong elements 26E are identical to each other, each of the prong elements 26E having a sector-shaped cross-section. The castellated element 26D has two sets of flat faces 26F and 26G formed thereon, and the flat faces (26F, 26G) in each set are diametrically opposed to each other. Each of the flat faces 26F has a threaded hole 26H formed therein, and each of the flat faces 26G has a threaded hole 26I formed therein. Note, in FIG. 4, only one of the flat faces 26F is visible, and only one of the flat faces 26G is visible.

Figure 5:
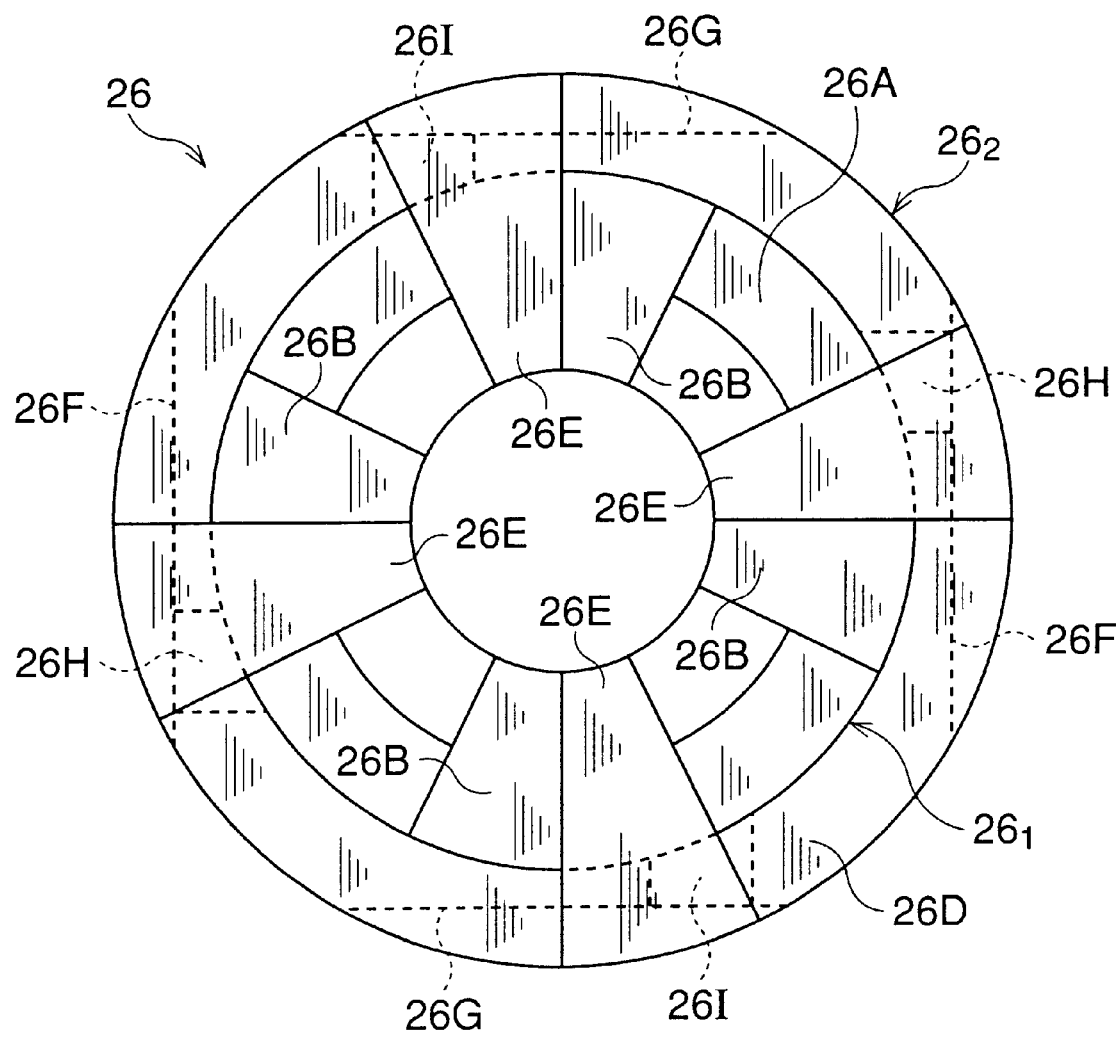
FIG. 5 is a front view of the coupling of FIG. 4.

As best shown in FIG. 5, each of the threaded holes 26H and 26I is not positioned at a center of the corresponding flat face (26F, 26G). In particular, the respective threaded holes (26H, 26I) in each set are offset from the centers of the respective flat faces (26F, 26G) while remaining diametrically opposed. In other words, the respective threaded holes 26H and 26I are arranged so as to be offset from the centers of the flat faces 26F and 26G in a counter-clockwise direction in FIG. 5.

Accordingly, after the castellated element 26A of the immovable coupling part $26_1$ is slidably and rotatably received in the tubular castellated element 26D of the movable coupling part $26_2$, as shown in FIG. 5, two screws 30 (FIG. 4) are threaded in two diametrically-opposed holes (26H or 26I), dependent upon the orientation of the tubular castellated element 26D with respect to the flat faces 26C of the castellated element 26A, until the respective tips of the screws 30 are abutted against the flat faces 26C. The movable coupling part $26_2$ is thereby subjected to a clockwise rotational force, whereby each of the prong elements 26E of the movable coupling part $26_2$ is pressed against the corresponding prong element 26B of the immovable coupling part $26_1$. Thus, after a crosswise end of the leaf-spring assembly 22 is engaged with the coupling 26, such that the four respective ends of the leaf spring elements 22A are located and clamped between the prong elements 26B and 26E, by threading the screws 30 in the diametrically-opposed holes (26H or 26I), the leaf-spring assembly 22 can be securely connected to the coupling 26a.

Note, a secure connection between the coupling 12E and the other crosswise end of the leaf-spring assembly 22 can be carried out in the same manner as with the coupling 26, because a structure of the coupling 12E is identical to that of the coupling 26, as mentioned above.

As is apparent from FIG. 1, each of the couplings 26 is securely attached to the frame portion 10B of the base member 10, by inserting a bolt element 32 into the through hole 28A of the block element 28, and then by threading the bolt element 32 into a corresponding threaded hole 10D formed in the frame portion 10B. The threaded holes 10D are located in two respective diametrically-formed recesses in the frame portion 10B, whereby each of the couplings 26 is accommodated in the corresponding recess. Thus, the movable member 12 is supported by the frame portion 10B through the intermediary of a set of leaf-assemblies 22.

Figure 6:
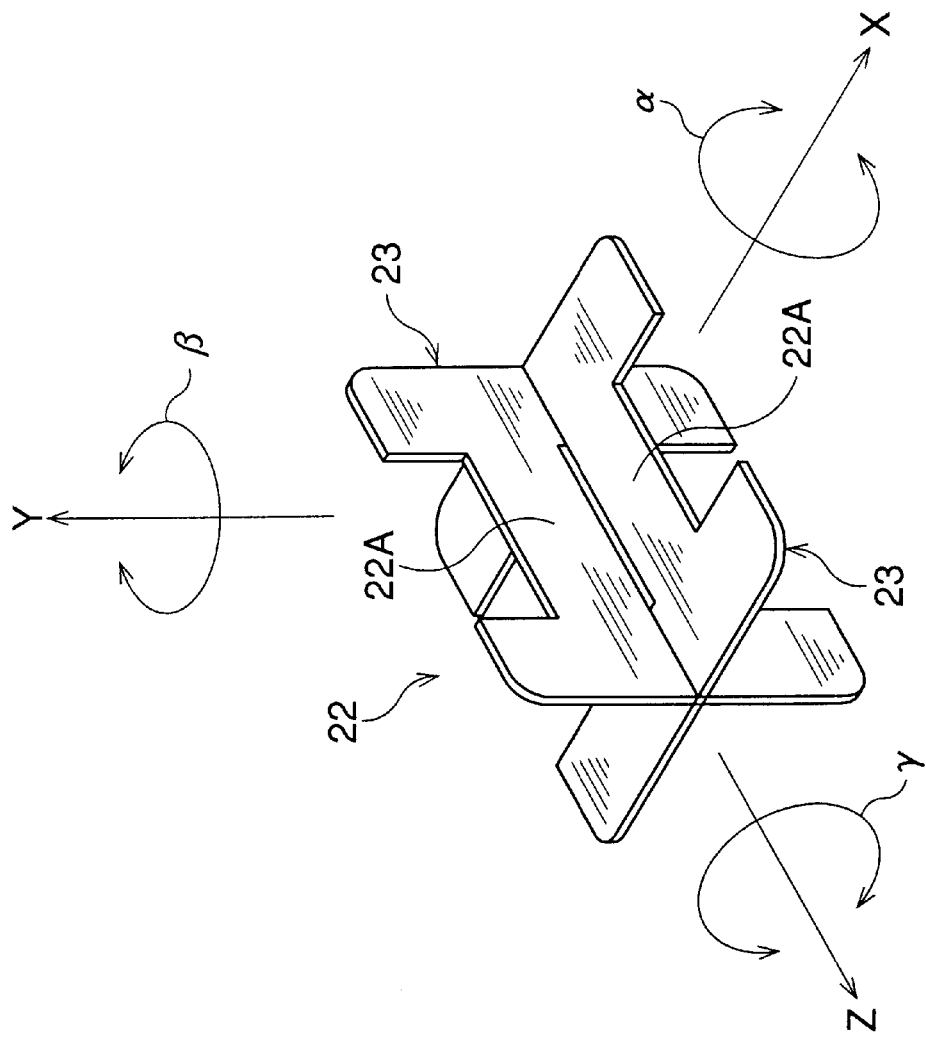
FIG. 6 is a perspective view of the leaf-spring assembly.

In this case, each of the leaf-spring assemblies 22 exhibits a high compliance around a central longitudinal axis thereof. In particular, as shown in FIG. 6, when a three dimensional coordinate system is defined with respect to each leaf-spring assembly 22, such that an H-shaped spring plate 23 is included in both the X-Z plane and the Y-Z plane of the coordinate system, and such that the central longitudinal axis of the leaf-spring assembly 22 coincides with the Z-axis of the coordinate system, the compliance (indicated by reference α) around the X-axis of the coordinate system is substantially equal to the compliance (indicated by reference β) around the Y-axis of the coordinate system, which is considerably lower than the compliance (indicated by reference γ) around the Z-axis of the coordinate system.

When the electromagnetic coils 12C and 12D of the movable member 12 are electrically energized in a magnetic field produced by the two sets of permanent magnets 18 and 20, the movable member 12 is rotated around a rotational axis extending therethrough in accordance with Fleming's Rule, whereby a rotational direction of the movable member 12 depends upon a direction in which an electric current flows through the electromagnetic coils 12C and 12D. In this case, a rotational axis of the movable member 12 is defined by the cental longitudinal axes (Z-axis) of the set of leaf-spring assemblies 22, and is referred to as an elastic-main-axis of the movable member 12 hereinafter.

As already mentioned, since each of the leaf-spring assemblies 22 exhibits a high compliance only around the central longitudinal axis thereof, the leaf-spring assemblies 22 are less susceptible to structure-coupled-oscillations and thrust-coupled-oscillations. Accordingly, the rotational movement of the movable member 12 can be stably and reliably performed.

Preferably, an arrangement of the mass of the movable member 12 is configured such that the center of gravity thereof is located on the rotational axis of the movable member 12. Namely, the elastic-main-axis (Z-axis) of the movable member 12 substantially coincides with an inertial-main-axis of the movable member 12, which passes through the center of gravity thereof. By incorporation of this concept, a production of the structure-coupled-oscillations can be further suppressed in the leaf-spring assemblies 22.

Furthermore, an arrangement of the mass of the movable member 12 is configured such that a rotational center thereof is located on the rotational axis of the movable member 12. Namely, the elastic-main-axis (Z-axis) of the movable member 12 substantially coincides with a thrust-main-axis of the movable member 12, which passes through the rotational center thereof. By incorporation of this concept, a production of the thrust-coupled-oscillations can be further suppressed in the leaf-spring assemblies 22.

Of course, most preferably, the elastic-main-axis, inertial-main-axis, and thrust-main-axis of the movable member 12 should coincide with each other, thereby ensuring greater suppression of the structure-coupled-oscillations and the thrust-coupled-oscillations in the leaf-spring assemblies 22, resulting in more stable and reliable rotational movement of the movable member 12.

Figure 7:
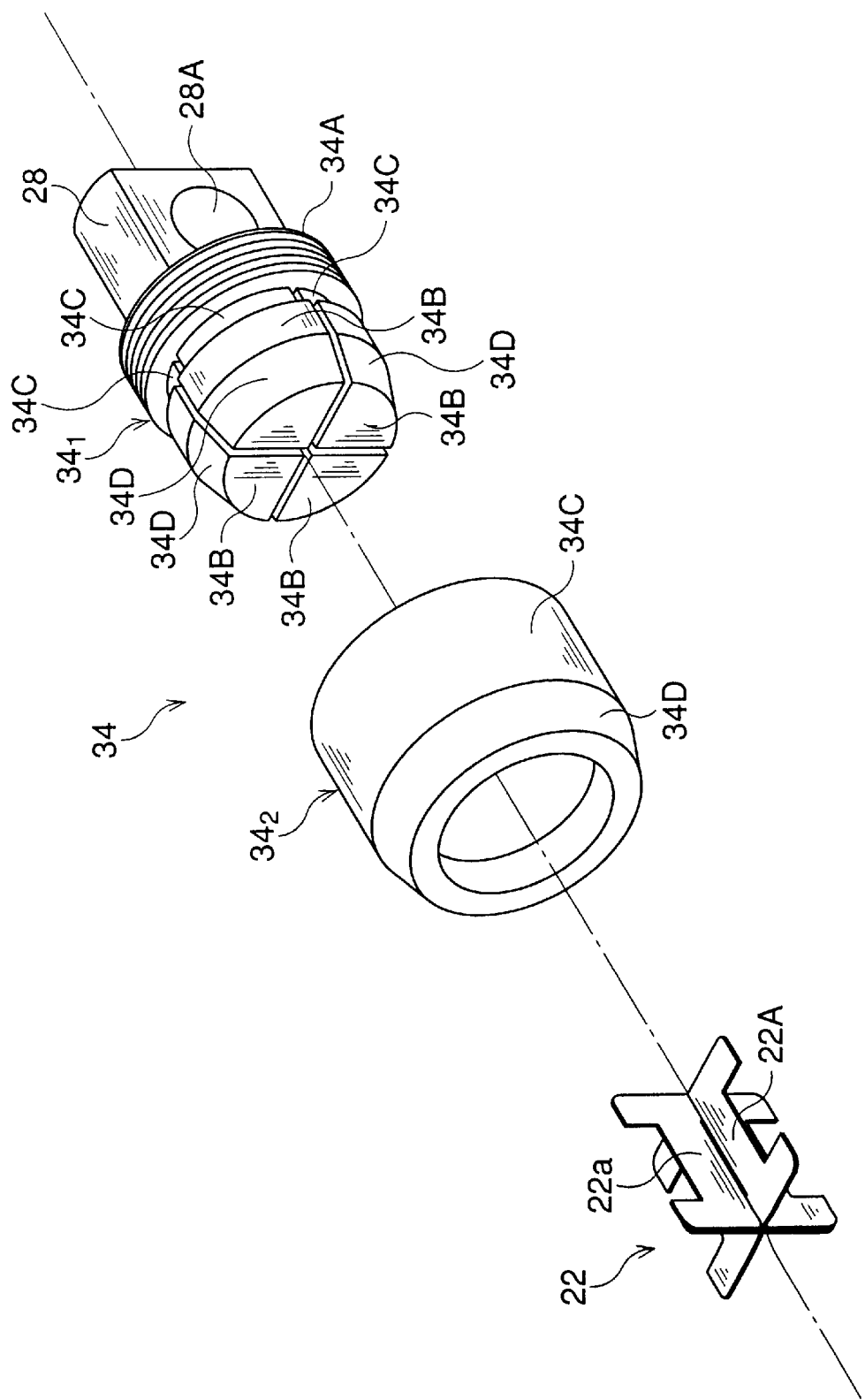
FIG. 7 is an exploded perspective view of another type of coupling which can be used in the optical deflection device according to the present invention.

FIG. 7 shows another type of coupling for the leaf-spring assemblies 22, which is generally indicated by reference 34. The coupling 34 includes an immovable castellated coupling part $34_1$, and a movable coupling part $34_2$ detachably associated therewith.

The immovable castellated coupling part $34_1$ has a male threaded portion 34A, and four prong elements 34B securely attached to an end face of the male threaded portion 34A in a cantilever manner. Each of the prong elements 34B is formed as a solid element, but it is joined to the end face of the male threaded portion 34A through the intermediary of a corresponding thin sector-shaped plate element 34C. Thus, the four prong elements 34B are movable with respect to the male threaded portion 34A due to a resilient elastic deformability of the thin sector-shaped plate element 34C.

As is apparent from FIG. 7, each of the four prong elements 34B has a quadrant-shaped cross-section, and these prong elements 34B are arranged so as to form a crosswise slit for receiving a crosswise end of the leaf-spring assembly 22. Also, each of the four prong elements 34A has a tapered face 34D formed along a quadrant edge thereof.

The movable coupling part $34_2$ is formed as a sleeve element 34E which has an outer annular tapered face 34F formed along a circular edge thereof. The sleeve element 34E has a female thread formed along an inner peripheral surface thereof, and thus the movable coupling part $34_2$ can be threaded onto the male threaded portion 34A of the immovable castellated coupling part $34_1$. Also, the sleeve element 34E has an inner annular tapered face 34G correspondingly formed with respect to the outer annular tapered face 34F. The movable coupling part $34_2$ has circular openings defined at both end faces of the sleeve element 34E. Although the circular opening 34H is smaller than the other circular opening of the sleeve element 34E, due to the formation of the outer and inner annular tapered faces 34F and 34G, the restricted circular opening 34H has a size enough to allow the leaf-spring assembly 22 to clear therethrough.

Accordingly, after the crosswise end of the leaf-spring assembly 22 is inserted in the crosswise slit defined by the four prong elements 34B, when the movable coupling part $34_2$ is threaded onto the immovable castellated coupling part $34_1$, the four prong elements 34B are resiliently moved inward so as to close on each other due to an engagement between the inner annular tapered face 34G and the tapered faces 34D. Thus, the crosswise end of the leaf-spring assembly 22 is clamped by the four prong elements 34B.

Note, as shown in FIG. 7, similar to the coupling 26 (FIG. 4), the immovable castellated coupling part $34_1$ of the coupling 34 is provided with an integrally-formed block element 28 having a through hole 28A, whereby the block element 28 is used for attaching the coupling 34 to the frame portion 10B of the base member 10. Also, although a coupling for connecting the leaf-spring assembly 22 to the movable member 12 is not illustrated, a method of attachment is identical to that utilized by the coupling 34, except that the former is provided with an integerally-formed screw, as indicated by reference 13 in FIG. 2, in place of the block element 28.

Figure 8:
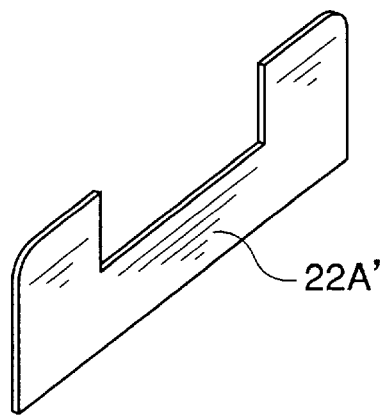
FIG. 8 is a perspective view of a representative leaf spring element used for forming a leaf-spring assembly.

Although the leaf-spring assembly 22 is formed from the set of H-shaped spring plates 23 (FIG. 3), it may be formed from four single-leaf-spring elements 22A', one of which is representatively shown in FIG. 8. Namely, the leaf-spring assembly 22A, which is equivalent to the leaf-spring assembly 22, can be obtained by arranging the four single-leaf-spring elements 22A' in a manner shown in FIG. 9, and by connecting them to the sets of couplings (12E, 26).

Figure 10:
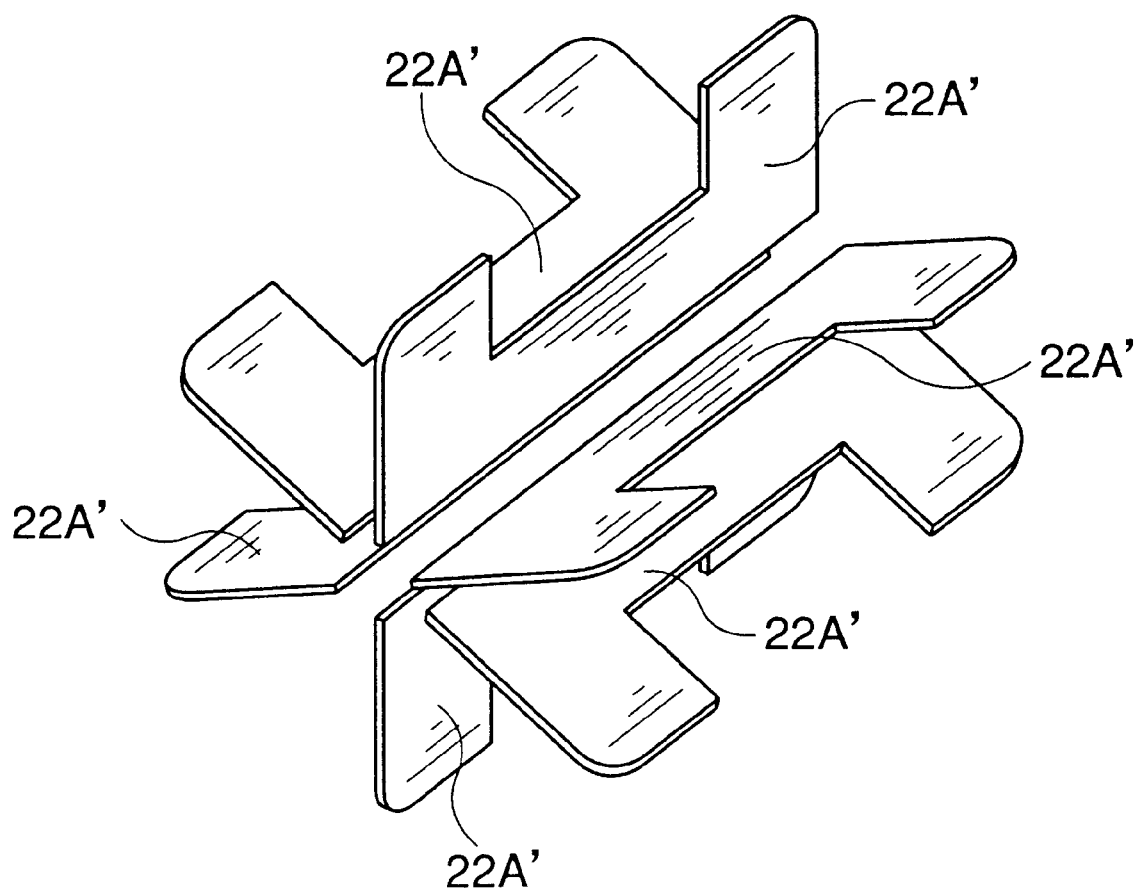
FIG. 10 is a perspective view of a leaf-spring assembly formed using six of the leaf spring elements shown in FIG. 8.

Use of the single-leaf-spring elements 22A' are convenient, because a leaf spring assembly consisting of various numbers of the leaf-spring elements 22A' can be easily obtained. For example, as shown in FIG. 10, it is possible to easily obtain a leaf-spring assembly consisting of six of the single-leaf-spring elements 22A', by arranging them at regular 60 degree intervals around a central longitudinal axis of the leaf-spring assembly. Also, as shown in FIG. 11, it is possible to easily obtain a leaf-spring assembly consisting of eight of the single-leaf-spring elements 22A', by arranging them at regular 45 degree intervals around a central longitudinal axis of the leaf-spring assembly.

Figure 9:
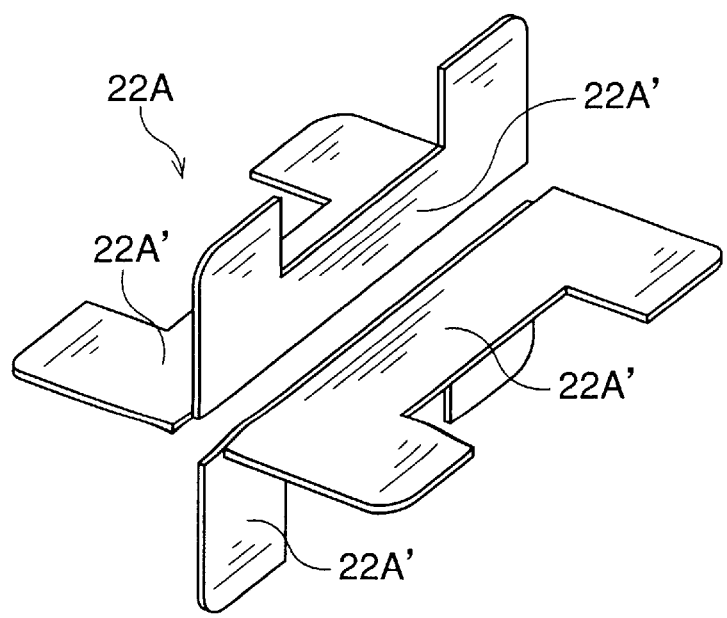
FIG. 9 is a perspective view of a leaf-spring assembly formed using four of the leaf spring elements shown in FIG. 8.
Figure 11:
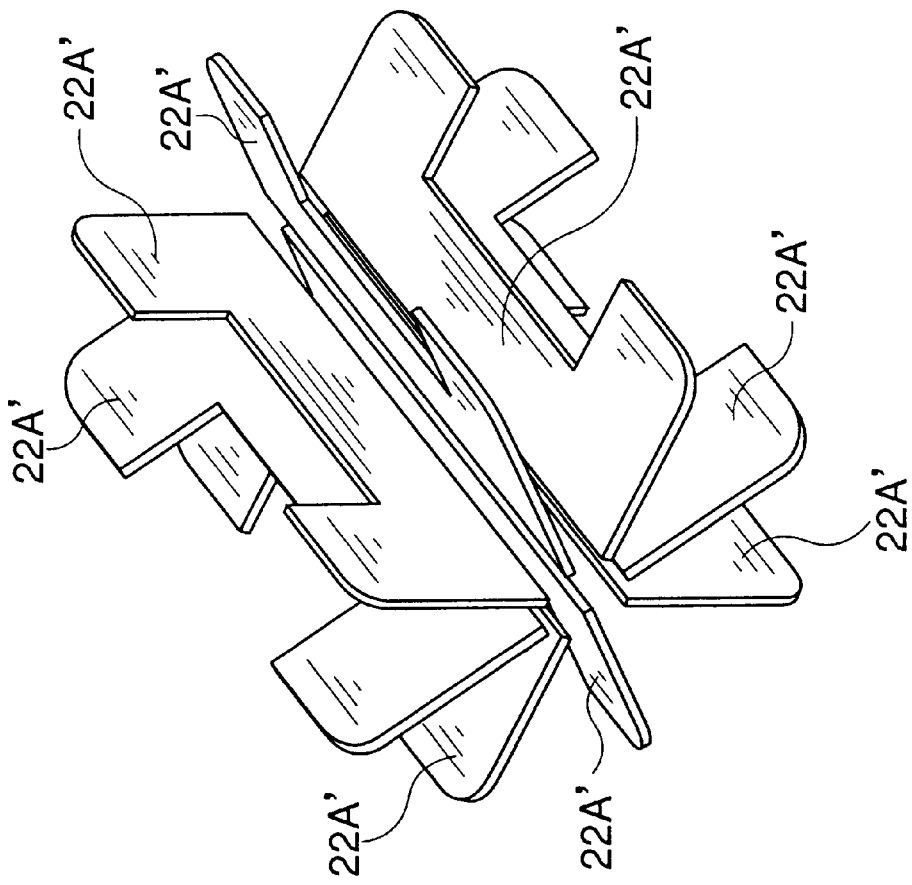
FIG. 11 is a perspective view of a leaf-spring assembly formed using eight of the leaf spring elements shown in FIG. 8.

In the embodiments shown in FIGS. 9, 10 and 11, although the leaf-spring assembly includes an even number of the single-leaf-spring elements 22A', the leaf-spring assembly may include an odd number of the single-leaf-spring elements 22A'. For example, when the leaf-spring assembly is formed from three of the single-leaf-spring elements 22A', these elements are arranged at regular 120 degree intervals around a central longitudinal axis of the leaf-spring assembly. Also, when the leaf-spring assembly is formed from nine of the single-leaf-spring elements 22A', these elements are arranged at regular 40 degree intervals around a central longitudinal axis of the leaf-spring assembly.

In short, according to the present invention, the leaf-spring assembly may be formed from more than two of the single-leaf-spring elements 22A'. Of course, the couplings for connecting a leaf-spring assembly are adaptively constructed to suit a number of the single-leaf-spring elements.

In the embodiments, as illustrated, which include the even number of leaf-spring elements, although these leaf-spring elements are identical to each other, it is possible to form the leaf-spring assembly from several differing types of leaf-spring elements, provided that two diametrically-opposed leaf-spring elements are of the same type.

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Applications No. 8-354325 (filed on Dec.

19, 1996) and No. 8-354326 (filed on Dec. 19, 1996), which are expressly incorporated herein, by reference, in their entireties.

We claim:

1. An optical deflection device comprising:

a base member;

a movable member having an optical deflection element; and a set of leaf-spring assemblies provided at sides of said movable member and interposed between said base member and said movable member such that said movable member is resiliently and movably supported by said leaf-spring assemblies with respect to said base member, wherein each of said leaf-spring assemblies is formed from at least three leaf-spring elements arranged at uniformly angular intervals around an elastic-main-axis of said movable member.

2. An optical deflection device as set forth in claim 1, wherein the elastic-main-axis of said movable member coincides with an inertial-main-axis of said movable member.

3. An optical deflection device as set forth in claim 1, wherein the elastic-main-axis of said movable member coincides with a thrust-main-axis of said movable member.

4. An optical deflection device as set forth in claim 1, wherein the elastic-main-axis of said movable member coincides with both an inertial-main-axis and a thrust-main-axis of said movable member.

5. An optical deflection device as set forth in claim 1, wherein all of said leaf-spring elements are identical to each other.

6. An optical deflection device comprising:

a base member;

a movable member having an optical deflection element;

a set of leaf-spring assemblies provided at sides of said movable member and interposed between said base member and said movable member such that said movable member is resiliently and movably supported by said leaf-spring assemblies with respect to said base member, each of said leaf-spring assemblies being formed from at least three leaf-spring elements arranged at uniformly angular intervals around an elastic-main-axis of said movable member; and a set of releasable couplings provided at the sides of said movable member, each of said releasable couplings releasably connecting an end of the corresponding leaf-spring assembly to said movable member.

7. An optical deflection device as set forth in claim 6, wherein the elastic-main-axis of said movable member coincides with an inertial-main-axis of said movable member.

8. An optical deflection device as set forth in claim 6, wherein the elastic-main-axis of said movable member coincides with a thrust-main-axis of said movable member.

9. An optical deflection device as set forth in claim 6, wherein the elastic-main-axis of said movable member coincides with both an inertial-main-axis and a thrust-main-axis of said movable member.

10. An optical deflection device as set forth in claim 6, wherein all of said leaf-spring elements are identical to each other.

11. An optical deflection device comprising:

a base member;

a movable member having an optical deflection element;

a set of leaf-spring assemblies provided at sides of said movable member and interposed between said base member and said movable member such that said movable member is resiliently and movably supported by said leaf-spring assemblies with respect to said base member, each of said leaf-spring assemblies being formed from at least three leaf-spring elements arranged at uniformly angular intervals around an elastic-main-axis of said movable member; and a set of releasable couplings provided at the sides of said movable member, each of said releasable couplings releasably connecting an end of the corresponding leaf-spring assembly to said base member.

12. An optical deflection device as set forth in claim 11, wherein the elastic-main-axis of said movable member coincides with an inertial-main-axis of said movable member.

13. An optical deflection device as set forth in claim 11, wherein the elastic-main-axis of said movable member coincides with a thrust-main-axis of said movable member.

14. An optical deflection device as set forth in claim 11, wherein the elastic-main-axis of said movable member coincides with both an inertial-main-axis and a thrust-main-axis of said movable member.

15. An optical deflection device as set forth in claim 11, wherein all of said leaf-spring elements are identical to each other.

16. An optical deflection device comprising:

a base member;

a movable member having an optical deflection element;

a set of leaf-spring assemblies provided at sides of said movable member and interposed between said base member and said movable member such that said movable member is resiliently and movably supported by said leaf-spring assemblies with respect to said base member, each of said leaf-spring assemblies being formed from at least three leaf-spring elements arranged at uniformly angular intervals around an elastic-main-axis of said movable member;

a first set of releasable couplings provided at the sides of said movable member, each of said releasable couplings in said first set releasably connecting an end of the corresponding leaf-spring assembly to said movable member; and a second set of releasable couplings provided at the sides of said movable member, each of said releasable couplings in said second set releasably connecting an end of the corresponding leaf-spring assembly to said base member.

17. An optical deflection device as set forth in claim 16, wherein the elastic-main-axis of said movable member coincides with an inertial-main-axis of said movable member.

18. An optical deflection device as set forth in claim 16, wherein the elastic-main-axis of said movable member coincides with a thrust-main-axis of said movable member.

19. An optical deflection device as set forth in claim 16, wherein the elastic-main-axis of said movable member coincides with both an inertial-main-axis and a thrust-main-axis of said movable member.

20. An optical deflection device as set forth in claim 16, wherein all of said leaf-spring elements are identical to each other.

* * * * *